(12) United States Patent
Yazdanbod

(10) Patent No.: US 11,780,737 B2
(45) Date of Patent: Oct. 10, 2023

(54) PROCESS FOR THE SEPARATION AND SELECTIVE RECOMPOSITION OF IONS

(71) Applicant: Azaroghly Yazdanbod, Calgary (CA)

(72) Inventor: Azaroghly Yazdanbod, Calgary (CA)

(73) Assignee: IONIC SOLUTIONS LTD., Rancho Mirage, CA (US)

( * ) Notice: Subject to any disclaimer, the term of this patent is extended or adjusted under 35 U.S.C. 154(b) by 497 days.

(21) Appl. No.: 16/984,613

(22) Filed: Aug. 4, 2020

(65) Prior Publication Data

US 2020/0369528 A1 Nov. 26, 2020

Related U.S. Application Data

(62) Division of application No. 15/700,794, filed on Sep. 11, 2017, now Pat. No. 10,759,670.

(51) Int. Cl.
| | |
|---|---|
| *C01D 7/07* | (2006.01) |
| *C01D 1/28* | (2006.01) |
| *C25B 15/00* | (2006.01) |
| *B01D 61/44* | (2006.01) |
| *C25B 9/23* | (2021.01) |
| *C25B 9/70* | (2021.01) |
| *C02F 1/469* | (2023.01) |

(52) U.S. Cl.
CPC .............. *C01D 7/07* (2013.01); *B01D 61/44* (2013.01); *C01D 1/28* (2013.01); *C02F 1/4691* (2013.01); *C25B 9/23* (2021.01); *C25B 9/70* (2021.01); *C25B 15/00* (2013.01)

(58) Field of Classification Search
CPC ...... B01D 61/42; B01D 61/422; B01D 61/44; B01D 61/46; C02F 1/4691
See application file for complete search history.

(56) References Cited

U.S. PATENT DOCUMENTS

| | | | | |
|---|---|---|---|---|
| 4,033,842 A | * | 7/1977 | Loest ..................... | B01D 61/44 204/522 |
| 2012/0097541 A1 | * | 4/2012 | Yazdanbod ............ | B01D 61/44 204/520 |

* cited by examiner

*Primary Examiner* — Salil Jain
(74) *Attorney, Agent, or Firm* — Ronald J. Richter; Nesbitt IP LLC

(57) ABSTRACT

A device and process for the separate removal of oppositely charged ions from electrolyte solutions and recombining them to form new chemical compositions. The invention provides the ability to create multiple ion flow channels and then form new chemical compositions therefrom. The process is accomplished by selectively combining oppositely charged ions of choice from different electrolyte solutions via the capacitive behavior of high electrical capacitance electrodes confined in insulated containers. Industrial plants employing the inventive process can have the flexibility to produce needed industrial chemical compounds such as Soda Ash, Caustic Soda, hydrochloric acid and chlorine gas, based on market demand, and can be located near points of consumption to significantly reduce transportation costs.

4 Claims, 7 Drawing Sheets

PROCESS FOR THE SEPARATION AND SELECTIVE RECOMPOSITION OF IONS

CROSS-REFERENCE TO RELATED APPLICATIONS

This application is a divisional application of U.S. application Ser. No. 15/700,794 filed Sep. 11, 2017, the disclosure of which is incorporated herein by reference in its entirety.

FIELD OF THE INVENTION

The present invention relates to the separation and selective recombination of ions from differing electrolyte solutions to produce useful chemical compounds, and compounds which have limited occurrence in nature, such as soda ash.

BACKGROUND OF THE INVENTION

There are many chemical compounds which must be manufactured through special chemical processes. Such compounds are typically useful for various industrial purposes worldwide, but have only a limited occurrence in nature. The synthesis of these compounds typically requires a large number of steps, a large amount of energy, and the formation of intermediate by-products that are often of low value or are useless or even harmful to the environment. Therefore, in order to reduce energy consumption and the number of intermediate steps needed prior to reaching a final product, it would be advantageous in the industrial chemical arts to provide simplified synthesis processes for various useful chemical compounds.

Presently three industrial processes are used for manufacturing sodium carbonate (i.e. Soda Ash). The Solvay process uses limestone (calcium carbonate, $CaCO_3$) and salt brine (sodium chloride, NaCl) as raw materials, and ammonia ($NH_3$) as an intermediary, and is the prevailing process used in Europe and many other regions. The overall chemical equation for the Solvay Process can be written as:

$$CaCO_3 + 2NaCl \rightarrow Na_2CO_3 + CaCl_2) \quad \text{(Equation 1)}$$
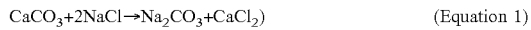

However, in order to reach the end products, the Solvay process involves many intermediate steps. First, calcium carbonate (limestone) is heated to release carbon dioxide:

$$CaCO_3 \rightarrow CaO + CO_2 \quad \text{(Equation 2)}$$

The remainder of the process is centered about a large hollow tower. At the top of the tower, a concentrated solution of sodium chloride and ammonia enter the tower. As the carbon dioxide bubbles up through this solution, sodium bicarbonate is produced and precipitates according to the following equation:

$$NaCl + NH_3 + CO_2 + H_2O \rightarrow NaHCO_3 + NH_4Cl \quad \text{(Equation 3)}$$
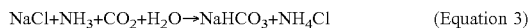

The sodium bicarbonate, separated by filtration, is then converted to sodium carbonate by heating it, which also releases water and carbon dioxide:

$$2\ NaHCO_3 \rightarrow Na_2CO_3 + H_2O + CO_2 \quad \text{(Equation 4)}$$

Calcium hydroxide is then produced by reacting the calcium oxide generated in Equation 2 with water:

$$CaO + H_2O \rightarrow Ca(OH)_2 \quad \text{(Equation 5)}$$

From here, the ammonium chloride produced in Equation 3 is treated with the calcium hydroxide produced in Equation 5 mainly to recover the ammonia which is recycled:

$$Ca(OH)_2 + 2\ NH_4Cl \rightarrow CaCl_2 + 2\ NH_3 + 2\ H_2O \quad \text{(Equation 6)}$$
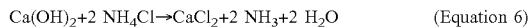

In addition to producing Soda Ash (i.e. sodium carbonate, see Equation 4), the Solvay process also generates calcium chloride as a by-product (see Equation 6). While calcium chloride has a number of uses, most notably as a road de-icing agent, typically the manufacturers of Soda Ash have a major issue disposing of this by-product. For example, in seaside locations such as Saurashtra, Gujarat, India, excess calcium chloride is deposited into the sea; or in Osborne, South Australia, after it was observed that calcium chloride was silting up the shipping channel, the practice of dumping it into a settling pond was adopted.

Another well-known process for manufacturing sodium carbonate is Hou's process. This process is advantageous where a supply of carbon dioxide is available but sources of limestone (i.e. calcium carbonate) are distant. In this process carbon dioxide (produced by such processes as steam reforming) is passed through a nearly saturated solution of sodium chloride and ammonia, much like the Solvay process (see Equation 3, above). However, after removal of the precipitated sodium bicarbonate ($NaHCO_3$), the remaining solution is cooled to allow the precipitation of ammonium chloride ($NH_4Cl$), which can be sold as a fertilizer after removal from the cooled solution. Because the ammonia and sodium chloride need to be replenished, Hou process plants need to be located near ammonia production facilities.

In the United States, the discovery in Wyoming and California of major sodium carbonate deposits in the form of the mineral Trona has led to the gradual replacement of synthetic Soda Ash production, partially in an effort to lessen the environmental impact of calcium chloride (from industrial Solvay process plants) polluting the ground water at plant site landfills. There are also Trona mines in Turkey and in Lake Magadi in Kenya. Purified Soda Ash produced by refining mined Trona ore can be shipped to paper and glass factories and for use in various chemical and petrochemical plants. For example, purified Soda Ash is typically shipped from mines in Wyoming and California to eastern and southern U.S. states, mostly by rail.

While the mining of Trona ore is one solution to synthetically manufacturing Soda Ash, the economic cost of transporting the purified Soda Ash across the country becomes a major consideration. And while synthesizing Soda Ash locally would be the preferred solution, current synthesis processes such as the Solvay process have their own economic and environmental problems, associated with the supply of reactants and the disposal of by-product calcium chloride and the economics of the scale requiring rather large plants to produce soda ash using the Solvay process.

In light of the above, it is apparent that there is a need in the art for a more economically and environmentally friendly process for the production of Soda Ash. U.S. Pat. Nos. 8,715,477, 9,309,133 and 9,315,398, which are all by the current inventor A. Yazdanbod and are incorporated herein by reference in their entireties, teach processes and devices for Ion Separation and Recomposition Technology (ISART). ISART involves synthesizing new chemical compounds that traditionally have been hard to construct, by exchanging oppositely charged ions from one chemical compound for those of another. The ISART inventions described in the patents listed above can also be used for desalination of water by selective removal and depletion of ions. With ISART, in its many variations, it is now possible to separately remove charged ions from a first electrolyte solution and selectively recombine these charged ions with oppositely charged ions from a second electrolyte solution to form new chemical compositions in one or two steps.

In light of the above discussion regarding the production of Soda Ash, it would be advantageous to employ certain applications of ISART technology to produce needed industrial chemical compounds such as Soda Ash. It would also be advantageous to provide a chemical production process for Soda Ash which uses less energy than current Solvay or Hou processes and does not include the production of calcium chloride. It would likewise be useful if an industrial plant producing Soda Ash has no by-products requiring disposal. It would further be advantageous if an industrial plant producing Soda Ash can be located near points of consumption, to significantly reduce transportation costs. It would also be useful if such a plant could have flexible production capabilities to adjust to varying market demands. It would further be advantageous if the polluting and greenhouse gas carbon dioxide could be utilized by a novel process to produce Soda Ash.

SUMMARY OF THE INVENTION

Accordingly, the present invention relates to improvements in the apparatuses and methods used and patented by the present inventor for Ion Separation and Recomposition Technology (ISART). The invention also relates to a novel approach for the production of Soda Ash (i.e. sodium carbonate) using the ISART process. Industrial plants employing the ISART process can have the flexibility to produce needed industrial chemical compounds such as Soda Ash, Caustic Soda, hydrochloric acid and chlorine gas, based on market demand, and can be located near points of consumption to significantly reduce transportation costs.

A first aspect of the invention is a process for capacitive generation of ion streams, comprising: (a) providing a first electrolyte solution in a first hydraulically isolated section and a second electrolyte solution in a second hydraulically isolated section, wherein each electrolyte solution comprises positive ions and negative ions; (b) separating the positive ions from the negative ions in each of the first and second electrolyte solutions, wherein separating comprises the steps of: (i) placing a first EDLC electrode inside the first electrolyte solution; (ii) placing a second EDLC electrode inside the second electrolyte solution; and (iii) applying an electric potential difference between the EDLC electrodes such that two capacitors in series are formed in each of the first and second electrolyte solutions; (c) electrically drawing the ions out of each of the first and second electrolyte solutions as oppositely charged ion streams, wherein the positive and negative ion streams are generated in a continuous fashion and are selectively drawn through an ion selective membrane selective to the ion stream; and (d) pooling the ion stream from the first electrolyte solution and the oppositely charged ion stream from the second electrolyte solution into a third hydraulically isolated section with sides made up of the ion selective membranes of the first and the second hydraulically isolated sections.

A second aspect of the invention provides an apparatus for separation and selective recomposition of ions, comprising (a) a cell comprising (i) a first insulated container; (ii) a first ion selective membrane; (iii) a second ion selective membrane, wherein the first and second ion selective membranes divide the volume of the first insulated container into a first hydraulically isolated volume, a second hydraulically isolated volume and a third hydraulically isolated volume, wherein the third hydraulically isolated volume is located between the first and the second hydraulically isolated volumes; (iv) a first EDLC electrode secured within the first hydraulically isolated volume; and (v) a second EDLC electrode secured within the second hydraulically isolated volume; and (b) an electric current supply source for connecting to and controlling the polarities of the first and second EDLC electrodes.

A third aspect of the invention provides an apparatus for separation and selective recomposition of ions, comprising in combination: (a) a first cell comprising (i) a first insulated container; (ii) a first ion selective membrane; (iii) a second ion selective membrane, wherein the first and second ion selective membranes divide the volume of the first insulated container into a first hydraulically isolated volume, a second hydraulically isolated volume and a third hydraulically isolated volume, wherein the third hydraulically isolated volume is located between the first and the second hydraulically isolated volumes; (iv) a first EDLC electrode secured within the first hydraulically isolated volume; and (v) a second EDLC electrode secured within the second hydraulically isolated volume; (b) a second cell comprising (i) a second insulated container; (ii) a third ion selective membrane; (iii) a fourth ion selective membrane, wherein the third and fourth ion selective membranes divide the volume of the second insulated container into a fourth hydraulically isolated volume, a fifth hydraulically isolated volume and a sixth hydraulically isolated volume wherein the sixth hydraulically isolated volume is located between the fourth and the fifth ones; (iv) a third EDLC electrode secured within the fourth hydraulically isolated volume; and (v) a fourth EDLC electrode secured within the fifth hydraulically isolated volume; (c) a first electric current supply source for connecting to and controlling the polarities of the first and second electrodes; and (d) a second electric current supply source for connecting to and controlling the polarities of the third and fourth electrodes.

A fourth aspect of the invention provides an apparatus for separation and selective recomposition of ions, comprising in combination: (a) a first cell comprising (i) a first insulated container; (ii) a first ion selective membrane; (iii) a second ion selective membrane, wherein the first and second ion selective membranes divide the volume of the first insulated container into a first hydraulically isolated volume, a second hydraulically isolated volume and a third hydraulically isolated volume, wherein the third hydraulically isolated volume is located between the first and the second hydraulically isolated volumes; (iv) a first electrode secured within the first hydraulically isolated volume, wherein the first electrode is a low electrical capacitance electrode which allows the occurrence of electrode reactions; and (v) a second electrode secured within the second hydraulically isolated volume, wherein the second electrode is an EDLC electrode; (b) a second cell comprising (i) a second insulated container; (ii) a third ion selective membrane; (iii) a fourth ion selective membrane, wherein the third and fourth ion selective membranes divide the volume of the second insulated container into a fourth hydraulically isolated volume, a fifth hydraulically isolated volume and a sixth hydraulically isolated volume wherein the sixth hydraulically isolated volume is located between the fourth and the fifth hydraulically isolated volumes; (iv) a half fuel cell device placed within the fourth isolated volume; and (v) a third electrode secured within the fifth hydraulically isolated volume, wherein the third electrode is an EDLC electrode; (c) a first electric current supply source for connecting to and controlling the polarities of the first and second electrodes; and (d) a second electric current supply source for connecting to and controlling the polarities of the third electrode and the porous electrode of the half fuel cell structure in the fourth volume, wherein the first hydraulically isolated volume includes a cap, the cap including a tube connecting the empty space above the first electrolyte solution to the half fuel cell device, and wherein the second current supply source includes a resistive or capacitive load that can consume the electric energy generated between its two ends so that the energy is used.

A fifth aspect of the invention provides an apparatus for separation and selective recomposition of ions, comprising in combination: (a) a first cell comprising (i) a first insulated container; (ii) a first ion selective membrane; (iii) a second ion selective membrane, wherein the first and second ion selective membranes divide the volume of the first insulated container into a first hydraulically isolated volume, a second hydraulically isolated volume and a third hydraulically isolated volume wherein the third hydraulically isolated volume is located between the first and the second hydraulically isolated volumes; (iv) a first electrode secured within the first hydraulically isolated volume, wherein the first electrode is a low electrical capacitance electrode which allows the occurrence of electrode reactions; and (v) a second electrode secured within the second hydraulically isolated volume, wherein the second electrode is an EDLC electrode; (b) a second cell comprising (i) a second insulated container; (ii) a third ion selective membrane; (iii) a fourth ion selective membrane, wherein the third and fourth ion selective membranes divide the volume of the second insulated container into a fourth hydraulically isolated volume, a fifth hydraulically isolated volume and a sixth hydraulically isolated volume wherein the sixth hydraulically isolated volume is located between the fourth and the fifth hydraulically isolated volumes; (iv) a third electrode secured within the fourth hydraulically isolated volume, wherein the third electrode is a low electrical capacitance electrode which allows the occurrence of electrode reactions; and (v) a fourth electrode secured within the fifth hydraulically isolated volume, wherein the fourth electrode is an EDLC electrode; (c) a first electric current supply source for connecting to and controlling the polarities of the first and second electrodes; and (d) a second electric current supply source for connecting to and controlling the polarities of the third and fourth electrodes.

The nature and advantages of the present invention will be more fully appreciated from the following drawings, detailed description and claims.

BRIEF DESCRIPTION OF THE DRAWINGS

The accompanying drawings illustrate embodiments of the invention and, together with a general description of the invention given above, and the detailed description given below, serve to explain the principles of the invention.

DETAILED DESCRIPTION OF THE INVENTION

As noted above, the scientific foundations of the present invention have been detailed in U.S. Pat. Nos. 8,715,477, 9,309,133 and 9,315,398 to current inventor A. Yazdanbod, which teach a number of embodiments of Ion Separation and Recomposition Technology (ISART). Generally, these patents teach that oppositely charged ions can be separately extracted from two differing input solutions, resulting in depletion of ions from the input solution and generation of two ionic streams, i.e. a positive ionic stream and a negative ionic stream, each having an excess of one polarity of ions. The oppositely charged ionic streams from each of the two differing solution can then be drawn into an ion sink and combined to form different, new solutions or chemical compounds as compared with the original input solutions.

Briefly, when two single Electric Double Layer Capacitor (EDLC) electrodes (i.e. a capacitive electrode which functions in a capacitive mode without the occurrence of electrode reactions) are each placed inside a separate electrolyte filled insulated container, herein called Ion Repulsion Cells (IRCs), and a DC voltage is applied between these two electrodes, there will be an excess of ions (having the same polarity as the charge applied to the electrode) that will concentrate at the outer edge of each of the individual containers. EDLC electrodes are made of electrically conductive material, such as carbon aerogels, carbon aerogel composites or any electrically conductive material exhibiting such electric capacitances of more than 1 Farads per gram, preferably more than 10 Farads per gram, and ideally more than 50 Farads per gram. When placed in contact with an electrolyte solution and DC voltage is applied, EDLC electrodes absorb ions and create an electric double layer of ions on the electrode. If the IRCs are hydraulically connected by a tube to a third container, herein called an Ion Sink, and there is an Ion Selective Membrane (ISM) associated with each of these tubes which create an ion selective barrier within the interior cross-section of these tubes, and if the polarity of each ISM is such that it would prevent the flow of ions of opposite polarity and allow ions of the same polarity of the ions accumulated on the inner surface of the related IRC, then there will be an ionic current of single polarity generated from each IRC, each having opposite polarity ions with respect to the other, entering the Ion Sink and neutralizing the other in the Ion Sink.

Figure 1:
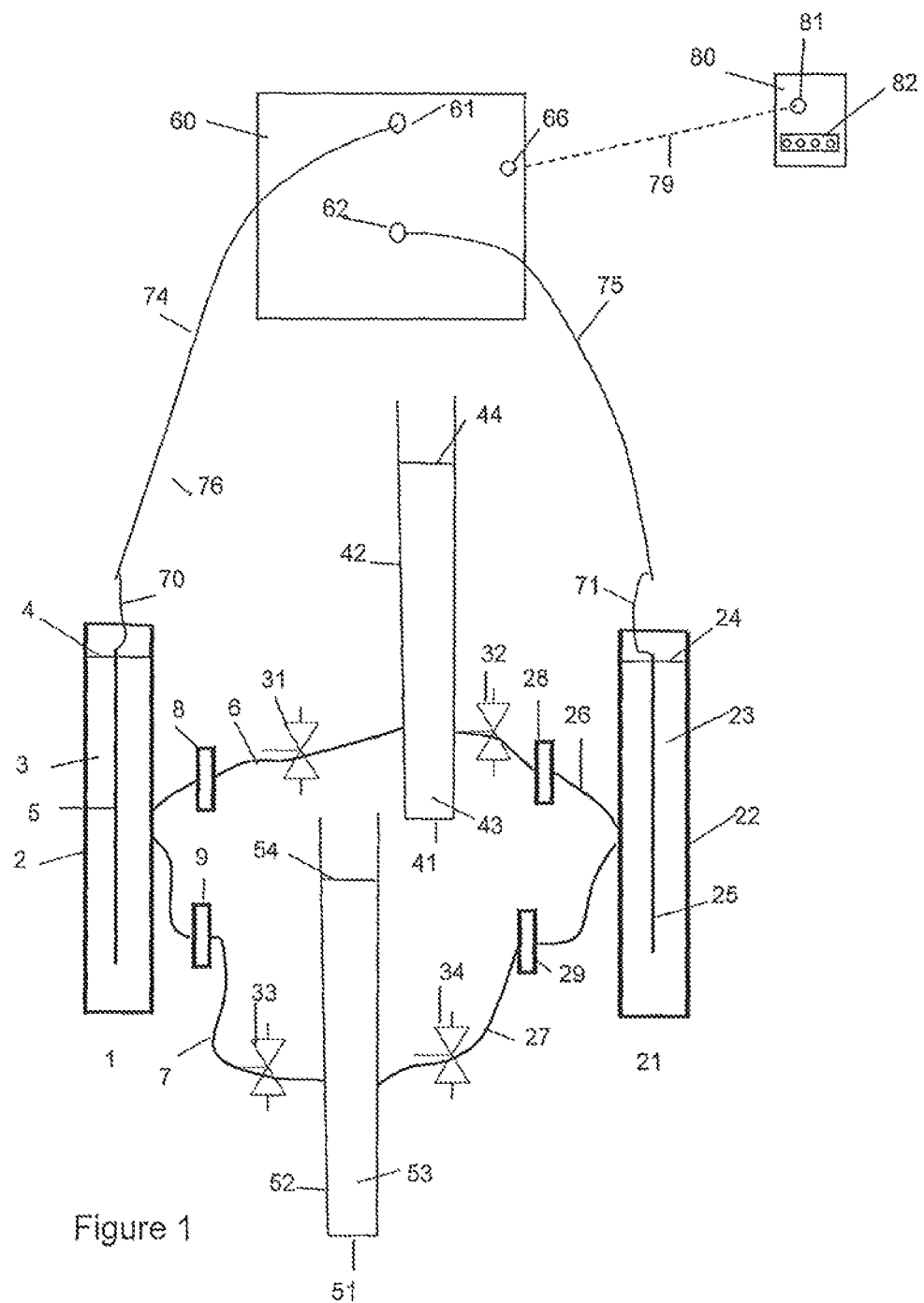
FIG. 1 illustrates one embodiment of the invention including two ion repulsion cells (IRC), two ion sinks and the command and control instruments according to prior art.

FIG. 1 illustrates a classic prior art embodiment of Ion Separation and Recomposition Technology (ISART). This typical embodiment includes two Ion Repulsion Cells (IRCs), two ion sinks, four control valves, four ion exchange membranes and command and control instruments. Looking at FIG. 1, a first IRC 1 includes a first insulated container 2 made from nonconductive material, containing a first electrolyte solution 3 filled to a level 4, and a first EDLC electrode 5. There is also a second IRC 21 having identical elements as the first IRC 1, namely a second insulated container 22 made from nonconductive material, containing a second electrolyte solution 23 filled to a level 24, and a second EDLC electrode 25. A first pair of flexible tubes or pipes 6 and 7 are connected to the first IRC 1, and an identical second pair 26, 27 are connected to the second IRC 21. Each of the pipes 6, 7, 26, 27 are equipped with inline filter holders 8, 9, 28, 29, respectively, each filter holder containing ion exchange membranes of a single polarity, herein referred to as Ion Selective Membranes or ISMs. Pipes 6 and 26 include first and second flow cut-off valves 31 and 32, respectively, and pipes 7 and 27 include third and fourth flow cut-off valves 33 and 34, respectively. IRCs 1 and 21 are hydraulically connected to a first ion sink 41 through pipes 6 and 26 and to a second ion sink 51 through pipes 7 and 27. Ion sink 41 includes a third insulated container 42, made from nonconductive material, filled with electrolyte 43 to level 44. Ion sink 51 includes a third insulated container 52, made from nonconductive material, filled with electrolyte 53 to level 54.

A direct current electric current supply source 60 capable of polarity reversal and having electric ports 61 and 62 is included. Each of the first and second EDLC electrodes 5 and 25 are connected to a metallic wire, 70 and 71 leading out of the IRC and connected to one pole of the power supply 60 through wires 74 and 75 respectively. Electric ports 61 and 62 could each be either positive or negative polarity. Power supply 60 also has another port 66 that outputs a given electric signal that changes depending on the polarity between poles 61 and 62. Cable 79 connects this port 66 to port 81 of a control device 80. The four output ports, shown together as outlet 82 of the control device 80, are each connected through appropriate cables (not shown) to one of the flow cut-off valves 31, 32, 33, 34. The control device 80 senses the polarity dependent signal through port 66 and switches the first and second flow cut-off valves 31 and 32 to a first orientation, e.g. to an open position, while simultaneously switching the third and fourth flow cut-off valves 33 and 34 to the opposite orientation, e.g. to a closed position.

For example, when the system is operated, the first EDLC electrode 5 could be negatively charged while the second EDLC electrode 25 could be positively charged. If, under this condition, flow cut-off valves 31 and 32 are open, and valves 33 and 34 are closed through the action of the control device 80, the ion selective membranes in inline filter holders 8 and 29 will be anion exchange membranes while the membranes in the filter holders 9 and 28 will be cation exchange membranes. With reference now to FIG. 1, it can be appreciated that if the power supply 60 is energized to any DC voltage level such that pole 62 is at a higher potential than pole 61 as stated before (and assuming that the electrical insulation capabilities of the insulated containers 2 and 22 are sufficient to prevent exchange of electric charge between the container and the outside environment), the build-up of potential between electrodes 5 and 25 will lead to generation of single oppositely charged ion currents flowing out of the two IRCs and into Ion Sink 41, neutralizing each other therein. This means that anions will now flow out of IRC 1 and cations will flow out of IRC 21 and the two will neutralize one another in the Ion Sink 41. At the same time, the capacitance of each EDLC electrode 5 and 25 will begin to fill.

Under this condition, if the first electrolyte solution 3 in IRC 1 is a solution of silver nitrate (AgNO$_3$) and the second electrolyte solution 23 in IRC 21 is a solution of sodium chloride (NaCl), silver ions (Ag$^+$) will begin to be capacitively absorbed to electrode 5 and chlorine ions (Cl$^-$) will begin to be capacitively absorbed to electrode 25. At the same time, an ionic current of nitrate ions (NO$_3^-$) will pass through tube 6 and inline filter 8 (containing an ion selective membrane ISM), entering Ion Sink 41 while an ionic current of sodium (Na$^+$) will flow out of IRC 21 through line 26 and ISM 28 and will also enter Ion Sink 41, neutralizing the nitrate ion stream and together forming a sodium nitrate solution (NaNO$_3$) in Ion Sink 41. Once the potential between one or both electrodes 5 and 25 and the ions capacitively absorbed to each electrode reach a level that would allow electrode reactions to occur between the ions and the electrode they are capacitively absorbed to, that is, once one or both these capacitors fill up, the polarity of the electric current supplied by power supply 60 could be reversed, signalling the control device 80 to close valves 31 and 32, and open valves 33 and 34. This reversal of applied potential to electrodes 5 and 25 will initially release the ions previously absorbed to these electrodes and in continuation of the process, will result in absorption of charges of opposite polarity with respect to the previously absorbed ions on the electrodes. This reversal of polarity combined with closure of valves 31 and 32 and the opening of valves 33 and 34 will now generate two oppositely charged ionic currents into Ion Sink 51. Thus, IRC 1 will now generate a sliver ion (Ag$^+$) current while IRC 21 will now generate a chlorine ion (Cl$^-$) current. These ionic currents pass through pipes 7 and 27, as well as ISM 9 and ISM 29, and neutralize each other in Ion Sink 51, forming silver chloride (AgCl) which precipitates therein. This was experimentally verified as reported in U.S. Pat. Nos. 8,715,477, 9,309,133 and 9,315,398. Once the capacitances of the electrodes fill up with ions or at any other earlier convenient time, the polarity of the voltage applied by power supply 60 is reversed again and the process switches to the formation of sodium nitrate (NaNO$_3$) in Ion sink 41 and then again to formation of silver chloride (AgCl) in Ion Sink 51 and so on.

There are other embodiments of Ion Separation and Recomposition Technology, as illustrated in U.S. Pat. Nos. 8,715,477, 9,309,133 and 9,315,398 (e.g. FIG. 3), wherein one IRC is equipped with an EDLC electrode while the other has a non-capacitive, typically metallic or carbon electrode. In this setup, the IRC with the non-capacitive electrode is used, for example, to generate hydroxide (OH$^-$) ions towards the related Ion Sink; here, the generated hydrogen gas exiting the solution is ionized in a half fuel cell structure and is reacted with the negatively charged ions generated by the first IRC in the second phase of operation to produce such compounds as hydrochloric acid. There is also the embodiment wherein there is one capacitive IRC and two non-capacitive IRCs, as illustrated in U.S. Pat. Nos. 8,715, 477, 9,309,133 and 9,315,398 (e.g. FIG. 4). While certainly useful as patented, it is notable that all of the embodiments presented in these ISART patents include valves (e.g. 31-34) that close the path of communication to one Ion Sink while the other Ion Sink is being used, such that half of the time one of the Ion Sinks sits idle.

For example, in each half cycle operation of a given ion repulsion cell, one of the two valves each placed on the passage leading to an ion exchange membrane and its related ion sink is closed and the other is opened. This means that half of the time, one ion exchange membrane set and their related ion sink are used while the other ion exchange membrane set and its related ion sink sit idle. Thus, production capacity is technically reduced by 50% compared to full utilization of each ion exchange membrane and each cell. Further, in each half cycle of operation, a given valve needs to initially close and then re-open in the next half cycle. This places a lot of stress on the system and requires a good deal of maintenance work to insure that these large surface area valves remain electrically and hydraulically sealed when closed.

It would therefore be advantageous for certain industrial applications of the ISART technology if one were to eliminate the need for valves to operate the ion repulsion cells and to be able to continuously operate each ion sink. Indeed, if these valves could be eliminated, the connection passages between the ion sinks and ion repulsion cells can be made shorter, the surface areas of the ion exchange membranes can be increased, and each ion exchange membrane set and its related ion sink can be utilized almost continuously. The present invention results from the discovery that, by eliminating the flow cut-off valves 31, 32, 33, 34 (see FIG. 1) and moving the ion filled electrodes, the output of the ISART system discussed above can be nearly doubled.

Figure 2:
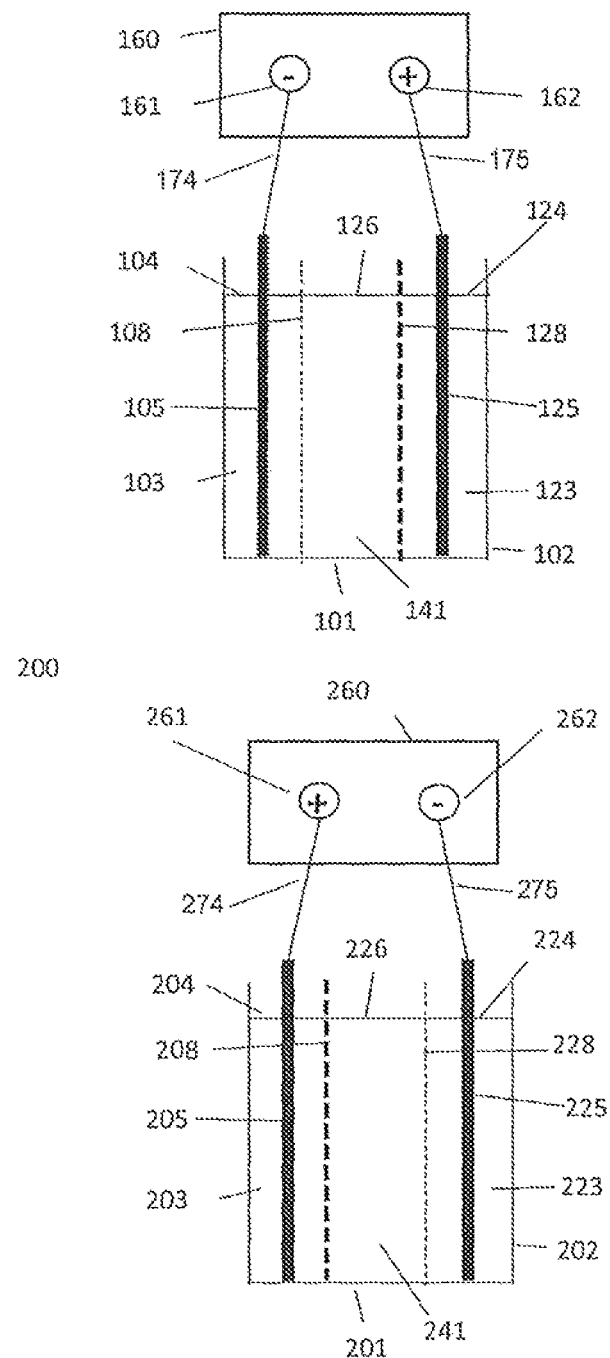
FIG. 2 illustrates an embodiment of the invention wherein valves are eliminated.

FIG. 2 presents such an alternative apparatus 200 for ISART, according to the present invention. In this apparatus, there are first and second insulated containers 101, 201 also referred to as Cells, which are typically cuboid in shape, but may be in any suitable shape. Cell 101 includes first and second Ion Selective Membranes (ISMs) 108, 128, and Cell 201 includes third and fourth ISMs 208 and 228. In Cell 101, ISM 108 is an anion exchange membrane and ISM 128 is a cation exchange membrane. In Cell 201, ISM 208 is a cation exchange membrane and membrane 228 is an anion exchange membrane. These membranes (108, 128, 208, 228) are completely sealed against the inner surface of their respective containers and divide the volume of each cell (101, 201) into three hydraulically isolated sections. Specifically, the resulting volumes in container 101 include first, second and third hydraulically isolated volumes or sections 103, 123 and 141, respectively, and likewise container 201 is divided into fourth, fifth and sixth hydraulically isolated sections 203, 223 and 241, respectively. Here, hydraulic isolation means that the liquid in each section is separated from the liquid in the adjacent sections as the ISMs are basically impervious to liquids and are perfectly sealed against the inner wall of the container they are in. Cell 101 also includes a first high capacitance EDLC electrode 105 in the first hydraulically isolated volume 103, and a second EDLC electrode 125 in the second hydraulically isolated volume 123. Similarly, cell 201 includes a third EDLC electrode 205 and a fourth EDLC electrode 225 in hydraulically isolated volumes 203 and 223, respectively. A direct current electric power source 160 includes pole 161 connected to electrode 105 via wire 174, and pole 162 connected to electrode 125 via wire 175. Similarly, a DC electric power supply 260 includes pole 261 connected to electrode 205 via wire 274, and pole 262 connected to electrode 225 via wire 275.

As shown FIG. 2, the three ISM-divided sections in each of cells 101 and 201 are each filled with an electrolyte solution to levels 104, 124 and 126 in cell 101 and to levels 204, 224 and 226 in cell 201. When the power supply 160 is turned on for cell 101, with pole 161 being negative and pole 162 being positive as shown, the interaction of the first EDLC electrode 105 with the electrolyte solution in section 103 will result in absorption of positively charged ions in the electrolyte solution to electrode 105, and repulsion of negatively charged ions towards the outer perimeter of the volume within section 103, which is the inner surface of section 103, including ISM 108. Similarly, in section 123 there will be negatively charged ions from the electrolyte solution absorbed to electrode 125, with positive ions being repulsed towards the outer perimeter of the volume within section 123, including ISM 128. With ISM 108 being an anion exchange membrane and ISM 128 being a cation exchange membrane, the repulsed ions from sections 103 and 123 pass through their respective ISM and enter middle section 141, where they can form a new compound combining the negative ions passing from section 103 and the positive ions passing from section 123. Meanwhile, with absorption of ions onto EDLC electrodes 105 and 125, the electric double layer capacitor formed between these ions and charges on the conductive body of each electrode begins to fill up, creating a potential difference between the two plates of the each EDLC electrode.

When the power supply 260 is turned on for cell 201 while cell 101 is being operated, the same series of phenomena occurring in cell 101 will occur in cell 201, but with opposite charges. Specifically, with pole 261 being positively charged and pole 262 being negatively charged, negative ions in the solution in section 203 will be absorbed to electrode 205 and positive ions will be repulsed towards the outer perimeter of section 203 (i.e. towards the inner surface of section 203, including ISM 208). Further, in section 223 there will be absorption of positive ions onto electrode 225 and repulsion of negative ions to the outer perimeter of section 223. With ISM 208 being a cation exchange membrane and ISM 228 being an anion exchange membrane, the repulsed ions from sections 203 and 223 pass through their respective ISM and enter middle section 241, where they can form a new compound combining the positive ions passing from section 203 and the negative ions passing from section 223. Meanwhile, with absorption of ions onto EDLC electrodes 105 and 125, the capacitor formed between these ions and charges on the conductive body of each electrode begins to fill up, creating a potential difference between the two plates of the each EDLC electrode.

Now, if the electrolyte solutions in sections 103 and 203 are the same, such as a solution of silver nitrate ($AgNO_3$), and if the electrolytes in sections 123 and 223 are also the same, such as a solution of sodium chloride (NaCl), positive silver ions ($Ag^+$) will be absorbed to electrode 105 and negative chlorine ions ($Cl^-$) will be absorbed to electrode 125. Thus, negative nitrate ions ($NO3-$) will be repulsed from section 103 and pass through ISM 108 (which is an anion exchange membrane) to enter the middle section 141 (i.e. the third hydraulically isolated volume 141 of cell 101), where they can encounter and neutralize positive sodium ($Na^+$) ions being repulsed from volume 123 and passing through ISM 128 (which is an cation exchange membrane), forming sodium nitrate ($NaNO_3$). Similarly, but with the charges on the electrodes being the reverse of those of electrodes 105 and 125, the ions absorbed to electrode 205 in cell 201 will be nitrate ions ($NO3^-$) and the ions absorbed to electrode 225 will be sodium ions ($Na^+$). Thus, positive silver ions ($Ag^+$) will be repulsed from section 203 and pass through ISM 208 (which is an cation exchange membrane) to enter middle section 241 (i.e. the sixth hydraulically isolated volume 241 of cell 201), where they can encounter and neutralize negative chlorine ions ($Cl^-$) being repulsed from section 223 and passing through ISM 228 (which is an anion exchange membrane), forming silver chloride (AgCl) as a precipitate.

Comparing FIG. 1 to FIG. 2, it can be appreciated that, while no valves are present, the first, second, fourth and fifth hydraulically isolated volumes/sections 103, 123, 203 and 223 all function as Ion Repulsion Cells (IRCs) and the third and sixth hydraulically isolated sections 141 and 241 function as Ion Sinks, as described above.

As noted above, ions of opposite polarity are capacitively absorbed to each EDLC electrode, creating a potential difference between the electrode and the surrounding electrolyte solution (due to the flow of ions out of each IRC).

Once this potential difference reaches the level wherein electrode reactions (i.e. redox reactions) begin to occur between the absorbed ions and the electrodes, then the electrodes are saturated with ions and can no longer store additional ions. More specifically, with continuous operation of this system and the consequent further increase of the number of ions capacitively absorbed to each electrode, redox reactions occur such that absorbed positive ions on electrodes gain electrons from the negatively charged electrodes (such as $Ag^+$ ions gaining an electron and becoming elemental silver) and the absorbed negative ions on positively charged electrodes give electrons to the electrodes (such as $Cl^-$ ions giving an electron to the electrode and becoming chlorine gas).

Figure 3:
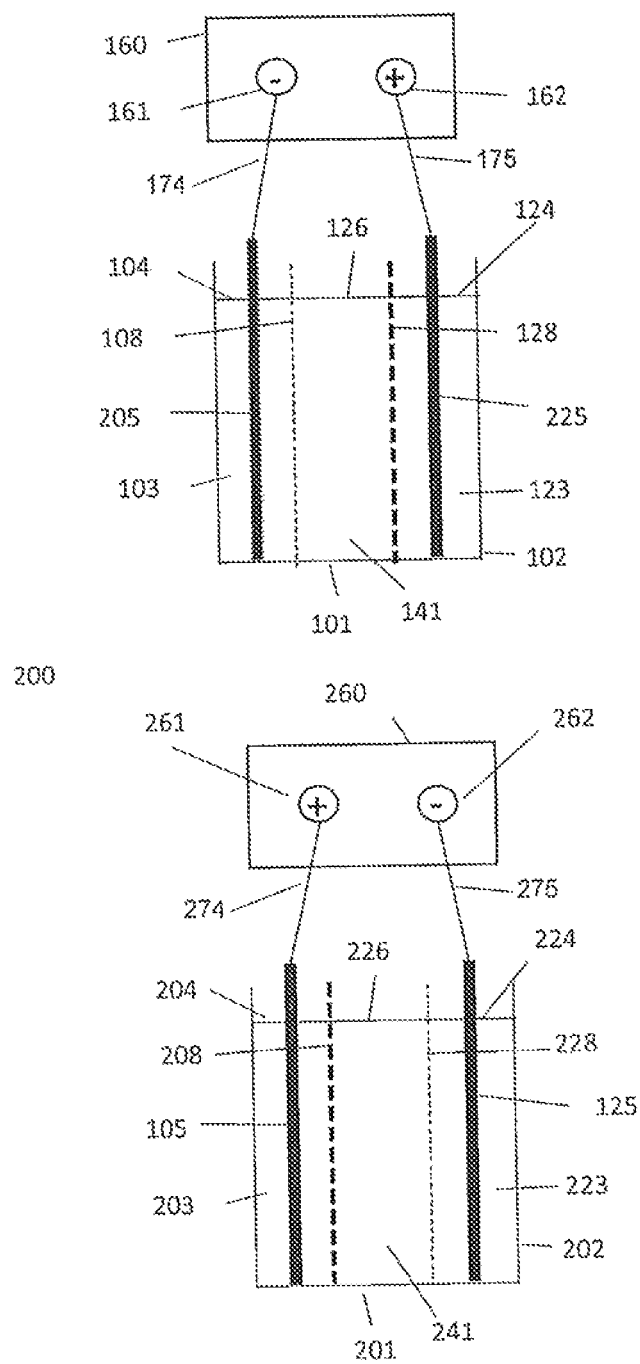
FIG. 3 illustrates the setup of FIG. 2 wherein the electrodes from one cell are switched with the electrodes of the other.

FIG. 3 shows the embodiment of FIG. 2, except that the EDLC electrodes from cells 101 and 201 have been switched to avoid redox reactions at the EDLC electrodes. That is, when redox reactions begin to occur or at any other convenient time before this point, EDLC electrodes 105 and 205 from FIG. 2 can be switched between sections 103 and 203, respectively, and EDLC electrodes 125 and 225 can also be switched between sections 123 and 223, respectively. That is, as shown in FIG. 3, electrode 105 is placed in section 203 of cell 201, and electrode 205 is placed in section 103 of cell 101, while electrode 125 is placed in section 223, and electrode 225 is placed in section 123. With this embodiment, when the power supply units 160, 260 are turned on, the previously stored ions on each EDLC electrode will begin being repulsed from the electrode, entering the surrounding solution. Further, these electrodes will now also begin to absorb ions of opposite polarity compared to the ones being removed from them.

For example, looking at FIG. 3, electrode 205 that is now connected to pole 161 and is receiving electrons (−) from the power supply will begin repulsing the previously absorbed nitrate ions ($NO3^-$) and will begin absorbing silver ions ($Ag^+$) from the adjacent silver nitrate solution. The newly released nitrate ions will then move to the outer perimeter of section 103, as before, and move through the respective ISM 108 and enter the associated ion sink 141, while the previously stored sodium ions are repulsed from the positive EDLC electrode 225, which now begins to absorb chloride ions, such that positive sodium ions passing through ISM 128 join with the negative nitrate ions in ion sink 141 to create sodium nitrate ($NaNO_3$). This process will also occur for the silver ions previously absorbed to EDLC electrode 105 and those additional silver ions repulsed from the silver nitrate electrolyte solution in IRC 203, and for chlorine ions stored on electrode 125 and those additional chlorine ions repulsed from the sodium chloride electrolyte solution in IRC 223, such that silver and chloride ion streams will now pass through ISM 208 and ISM 228 respectively and will enter ion sink 241 to produce silver chloride. This process can be run continuously, except for the period of time it takes to switch the EDLC electrodes from one IRC to the other. Once again, when the capacitors at EDLC electrodes approach their capacity or at any earlier convenient time, the switching of the location of electrodes can be repeated as before, ensuring almost continuous production of the products in both ion sinks 141, 241.

Figure 4:
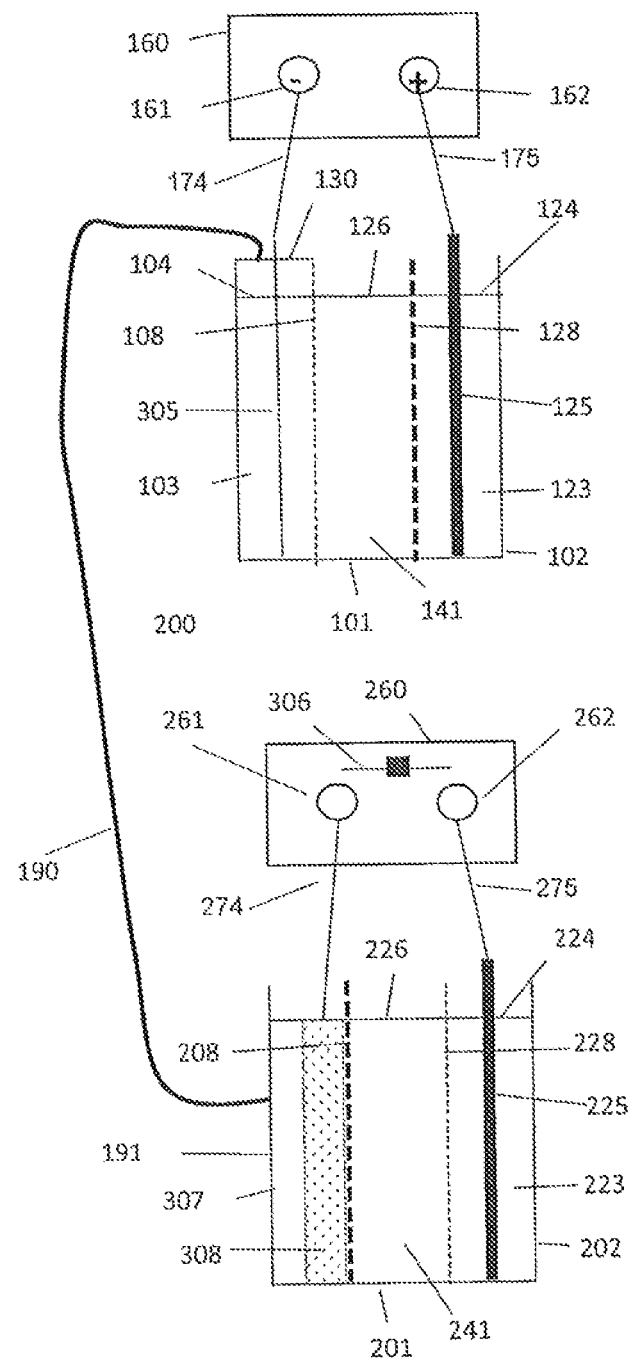
FIG. 4 illustrates another embodiment of the invention wherein a non-capacitive electrode is used and wherein one half cell is replaced with a half fuel cell structure.

Another embodiment of the present invention is shown in FIG. 4, which is designed to resolve the underutilization of prior art ISART cells where water ($H_2O$) is one of the electrolyte solutions, and also addresses the production of acids or basis where hydrogen and hydroxide ions are needed. In FIG. 4 all components are the same as in FIG. 2, except for the following: (1) the EDLC electrode 105 in FIG. 2 is replaced by low capacitance electrode 305; (2) hydraulically isolated section 203 of FIG. 2 (including EDLC electrode 205 and the electrolyte solution, since all collectively serves as an Ion Repulsion Cell) is replaced in FIG. 4 by a half fuel cell device 191, which will be described in more detail below; (3) section 103 is now capped, and there is a tube 190 connecting the empty space above the electrolyte solution level 104 to half fuel cell device 191; and (4) power supply unit 260 now includes an electric load 306, through which poles 261 and 262 of DC power supply 260 can be connected to one another when the power supply is turned off. Electric load 306 can be an electric circuit (or any combination of electric circuits) that can consume the electric energy generated between its two ends, such as a resistive load or capacitive load, so that the energy is used.

Regarding the low capacitance electrode 305 in FIG. 4, while the first EDLC electrode 105 (as well as electrodes 125, 205 and 225) of FIG. 2 are typically made of an electrically conductive material such as carbon aerogel having an electric capacitance from about 1 Farad per gram to more than 50 Farads per gram, the low capacitance electrode 305 is typically a metallic or simple carbon electrode. Such metallic or simple carbon electrodes typically have capacitances in the order of several micro-micro Farads ($\mu\mu F$ or $1*10^{-12}$ Farads) In the embodiment shown in FIG. 4, the electrolyte solution in section 103 is a solution of a specifically selected compound targeted to production of $H^+$ or $OH^-$ ions, and the electrolyte solution in section 123 is a high concentration solution of the raw material such as sodium chloride. Using this configuration, and when the goal is for IRC 103 to generate $OH^-$ ions, the electrolyte solution in IRC 103 must contain cations that have lower electrode potential than H+ ions, such as sodium or lithium.

Thus, when an electrolyte solution such as sodium hydroxide (NaOH, caustic soda) is placed in section 103, and with low capacitance electrode 305 being connected to a cathode pole, $OH^-$ ions will pass through ion exchange membrane (ISM) 108 and stream out of section 103 into ion sink 141, while redox reactions at the low capacitance electrode 305 cause hydrogen gas ($H_2$) to emit from IRC 103 to the empty space above it. Inversely, when the goal is for IRC 103 to generate H+ ions, the electrolyte solution in section 103 should contain anions that have higher electrode potential than $OH^-$, such as sulfuric acid ($H_2SO_4$). Under these conditions, the low capacitance electrode 305 will be an anode, redox reactions at electrode 305 will cause oxygen gas ($O_2$) to be emitted from IRC 103 to the empty space above it, and a stream of $H^+$ ions will pass through ISM 108 and into ion sink 141.

More specifically, looking at FIG. 4, when the electrolyte solution in hydraulically isolated section 103 is a solution of caustic soda (NaOH), the low capacitance electrode 305 is negatively charged, ISM 108 is an anion exchange membrane allowing the passage of negative ions, and ISM 128 is a cation exchange membrane allowing the passage of positively charged ions, the operation of the DC power source 160 will result in connection of a negative potential to the metallic electrode 305 and positive potential to the EDLC electrode 125. With sufficient electric potential applied, electrode reactions (Redox reactions) are initiated at electrode 305, which is bathed in NaOH solution. The electrolyte solution in the hydraulically isolated section 123 as well as the electrolyte in section 223 would typically be sodium chloride. Repulsion of positively charged sodium ions from section 123 will occur due to capacitive absorption of chlorine ions to the high capacitance EDLC electrode 125. Under these conditions, there will be a stream of $OH^-$ ions from IRC 103 and the repulsion of a stream of sodium ions from IRC 123, with both streams entering ion sink 141 and leading to the formation of caustic soda (NaOH) in ion sink 141. The use of caustic soda as electrolyte solution in IRC 103 will also result in generation of hydrogen gas ($H_2$) at the metallic electrode 305, which enters the empty space above level 104.

It should be noted that if the requirements of a particular design do not require the separation of the electrolyte solutions in section 103 and ion sink 141, then the corresponding ISM 108 can also be eliminated. Thus, in the example above, since NaOH is present in both section 103 and ion sink 141, ISM 108 could be eliminated. The reverse is true as well, that is, if by necessities of a design such as differences in concentration or compositions the electrolytes in volumes 103 and 141 need to be kept separate, ISM 108 will have to be used. Furthermore, given the very high pH of the caustic soda electrolyte used in volume 103 in the example above, and the subsequent formation of high pH caustic soda in volume 141, both ISM 108 (if needed) and ISM 128 would have to be of material that are stable in high pH environments.

Figure 5:
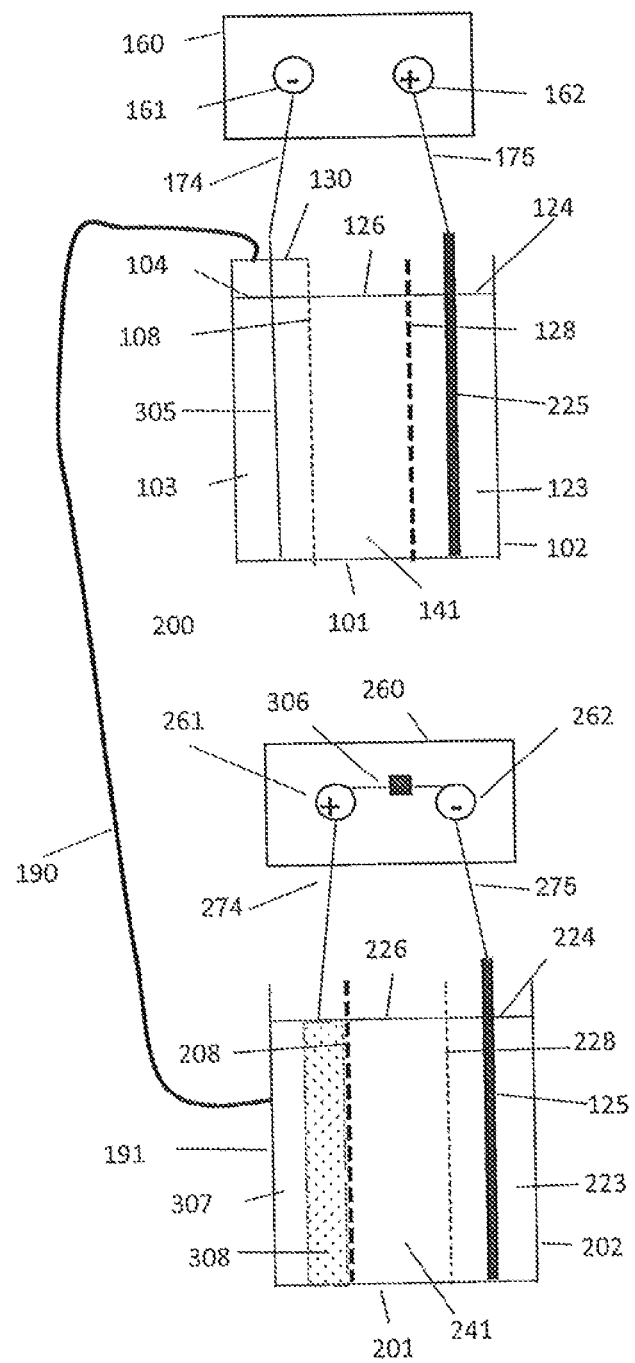
FIG. 5 illustrates the setup of FIG. 4 wherein the EDLC electrodes from one half cell is switched with that of the other.

FIG. 5 illustrates switching of EDLC electrodes 125 and 225, similarly as described above and shown in FIG. 3. Specifically, when the capacitors at EDLC electrodes 125 and 225 approach their capacity such that Redox reactions begin to occur (or at any earlier convenient time), the switching of the location of these electrodes can be done, ensuring almost continuous production of the desired product. Specifically, electrode 125 can be removed from volume 123 and then be placed in volume 223, while electrode 225 can be removed from section 223 and placed in section 123. This will allow electrode 225 to function in volume 123 in the same manner as electrode 125 functioned when it was in volume 123.

With DC power source 260 including electric load 306 connecting poles 261 and 262, moving EDLC electrode 125 (now containing a certain amount of chlorine ions) to volume 223 of cell 201 can cause electrode 125 to receive electrons generated by half fuel cell device 191. This can cause EDLC electrode 125 to release its chlorine ion ($Cl^-$) content and allow interactions with hydrogen ions ($H^+$) produced by device 191. Looking at FIG. 5, device 191 is a half fuel cell structure made up of an entry volume 307, a porous conductive electrode 308 made up of material such as carbon cloth, and an ISM 208 that in this case would have to be stable in the very low pH, acidic solutions produced in ion sink 241. To be able to ionize the hydrogen gas, the porous conductive electrode 308 should be coated with catalysts such as platinum or platinum black. Platinum black is widely used as a thin film on carbon cloth in fuel cells or for covering solid platinum metal, forming platinum electrodes. This "platinized platinum" has a surface area much higher than the geometrical surface area of the electrode, and exhibits action superior to that of platinum.

Hydrogen gas ($H_2$) entering from tube or conduit 190 can be ionized by device 191, splitting into an electron and a proton, wherein a stream of positively charged hydrogen ions ($H^+$, protons) can pass through the ISM 208 and combine with the negatively charged chlorine ions released from electrode 125 to form hydrochloric acid (HCl) in ion sink 241. At the same time, the negative electrons produced by ionization of the hydrogen gas will go through the electric load 306 of the DC power source 260 and back to electrode 125, making electrode 125 a cathode and facilitating the removal of chlorine ions therefrom. The potential difference across the electric load 306 is caused by the potential difference between the porous electrode 308 and electrode 125. This potential difference and the charges energized by it could then do work across the electric load 306. Alternatively, and with attention to FIG. 5, the electric load 306 could be eliminated and the DC power source 260 could be turned on to accelerate the formation of hydrochloric acid in ion sink 241 while negatively charging the EDLC electrode 125, causing IRC 223 to generate more chlorine ions and absorbing sodium ions to the EDLC electrode 125. After this operation, the now sodium ion-loaded electrode 125 can be returned to IRC 123, and electrode 225 that is now loaded with chlorine ions can be returned to IRC 223, so that the production of caustic soda (NaOH) in ion sink 141 and hydrochloric acid (HCl) in ion sink 241 can proceed continuously (except for the time it takes to switch the electrodes).

Figure 6:
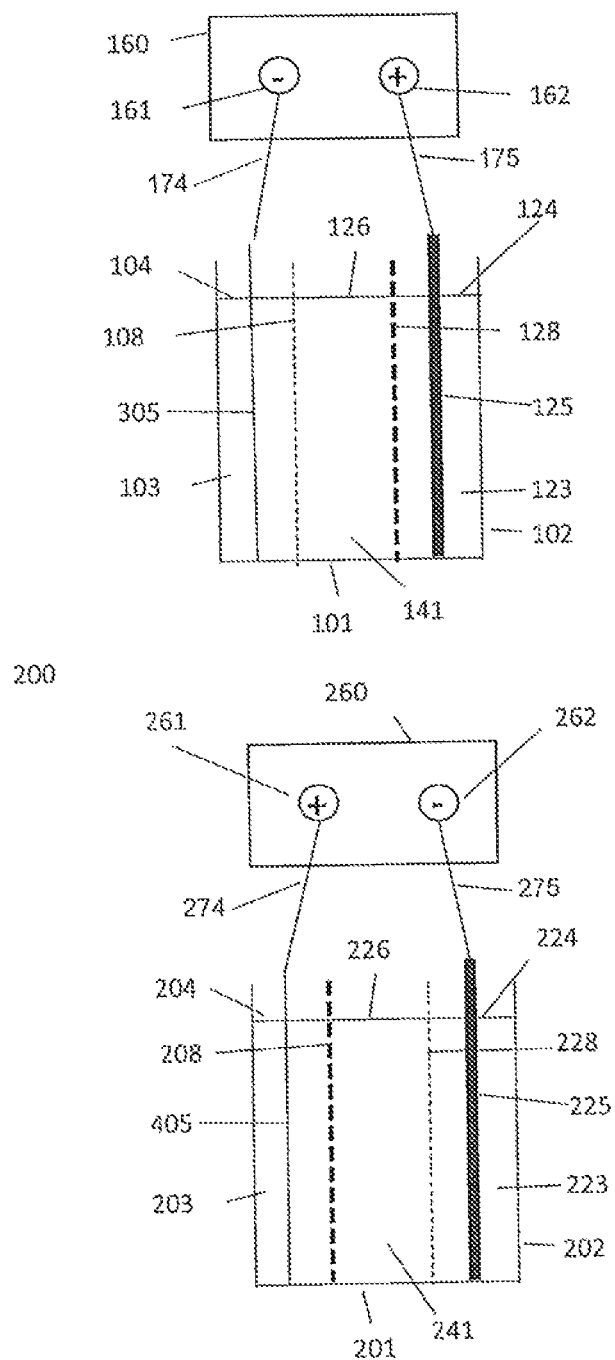
FIG. 6 illustrates another embodiment of the invention wherein each cell includes one EDLC and one non-capacitive electrode.
Figure 7:
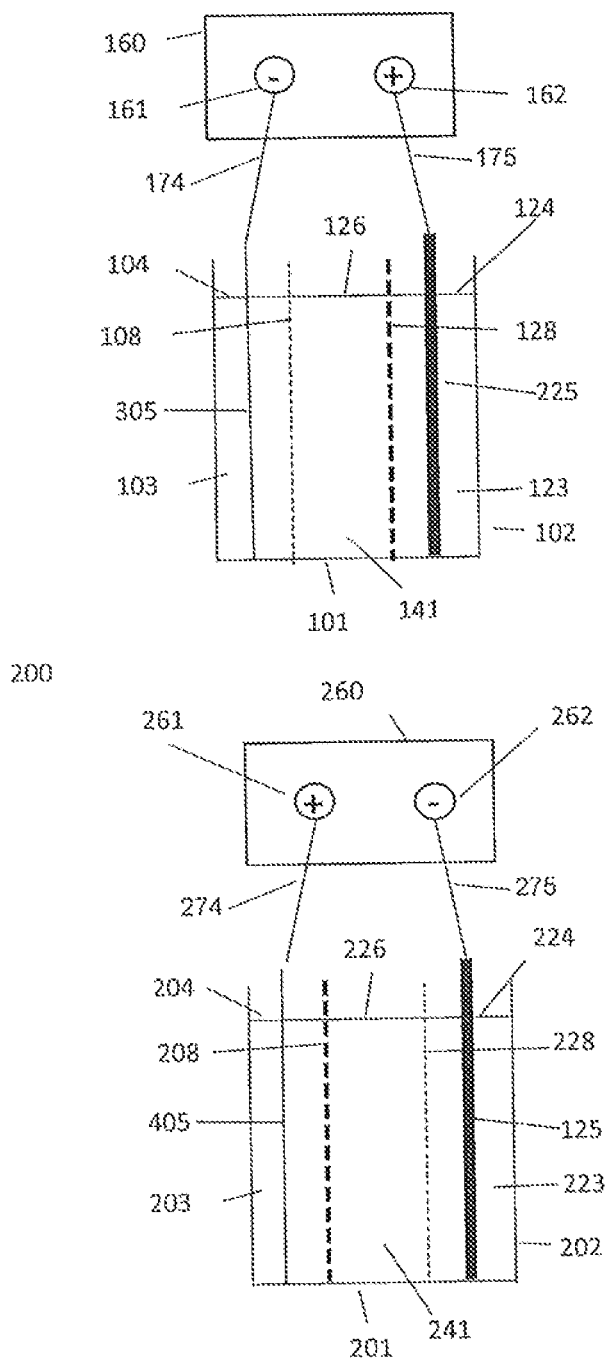
FIG. 7 illustrates the setup of FIG. 6 wherein the EDLC electrodes from one half cell is switched with that of the other.

An alternative embodiment of the present invention is illustrated in FIG. 6 and FIG. 7. In FIG. 6 all components are the same as in FIG. 2, with the exception that the two high capacitance EDLC electrodes 105 and 205 have been replaced with low capacitance metallic or carbon electrodes 305 and 405, respectively. This system is capable of benefiting from Redox reactions occurring in both hydraulically isolated sections 103 and 203, such that both acids and bases can be produced. With this arrangement a base solution can be caused to form in ion sink 141. Specifically, low capacitance, metallic electrode 305 can be placed in volume 103 containing an electrolyte solution of caustic soda (NaOH). With an applied potential from power source 160, section 103 acts as an IRC to generate a stream of hydroxide ions ($OH^-$) passing through ISM 108 to enter ion sink 141. Hydrogen gas ($H_2$) will be emitted above level 104 due to Redox reactions taking place at electrode 305. Now, if the electrolyte solution in hydraulically isolated volume 123 is a solution of ammonium chloride ($NH_4Cl$), EDLC electrode 125 will cause the repulsion of positively charged ions through cation exchange membrane (ISM) 128, such that section 123 acts as an Ion Repulsion Cell (IRC) to generate a stream of ammonium ions ($NH_4^+$) passing through ISM 128 to enter ion sink 141. With this arrangement, the hydroxide ($OH^-$) ion stream from volume 103 and the ammonium ($NH_4^+$) ion stream from volume 123 can combine in ion sink 141 to form a solution of ammonium water (typically denoted by the formula $NH_4OH$).

Simultaneously, low capacitance electrode 405 (acting as an anode) can be can be placed in volume 203 containing an electrolyte solution of sulfuric acid ($H_2SO_4$), and EDLC electrode 225 (acting as a cathode) can be placed in volume 223 containing an electrolyte solution of ammonium chloride ($NH_4Cl$). With an applied potential provided by power source 260, section 203 acts as an IRC to generate a stream of hydrogen ions ($H^+$) that pass through cation exchange membrane ISM 208 to enter ion sink 241, while redox reactions take place at electrode 405, emitting oxygen ($O_2$) gas out above level 204. Section 223 will act as an Ion Repulsion Cell (IRC) to generate a stream of chlorine ions ($Cl^-$) passing through ISM 228 to enter ion sink 241, such that the hydrogen and chloride ion streams can combine in ion sink 241 to form hydrochloric acid (HCl). This has been experimentally verified by the present inventor.

FIG. 7 illustrates switching of EDLC electrodes 125 and 225, similarly as described above and shown in FIGS. 3 and 5. Specifically, when the capacitors at EDLC electrodes 125 and 225 approach their capacity such that Redox reactions begin to occur (or at any earlier convenient time), the switching of the location of these electrodes can be done, ensuring almost continuous production of the desired product. Specifically, chlorine ion-containing EDLC electrode 125 can be removed from volume 123 and placed in volume 223, while ammonium ion-containing EDLC electrode 225 can be removed from section 223 and placed in section 123. This will allow production of ammonium hydroxide ($NH_4OH$) in ion sink 141 and hydrochloric acid (HCl) in ion sink 241 to continue uninterrupted, but for the time required to switch the location of electrodes 125 and 225.

In verification experiments carried out on this process using a cell closely adhering to cell 101 in FIG. 6, i.e. with hydraulically isolated volume 103 containing caustic soda (NaOH) and volume 123 containing ammonium chloride ($NH_4Cl$), thereby sending ammonium and hydroxide ion streams to ion sink 141, it was observed that due to the rather low solubility of ammonia in water at room temperature (about 18 mole per liter), evaporation of ammonia from the surface of ion sink 141 could easily be observed by its distinct smell and by the use of a wet pH detection paper that turned dark blue (signifying high pH in the range of 13 to 14), signifying emergence of ammonia from the solution formed therein.

The various embodiments of the present improvement of the ISART process described herein can be applied to the industrial production of Soda Ash. As noted above, the Solvay Process is one of the main industrial processes currently used for manufacturing sodium carbonate (i.e. Soda Ash), but the process involves many intermediate steps and produces non-useful by-products. To solve these problems, the present inventor surmised that the ISART process could be a likely candidate to improve the production process of Soda Ash. However, due to low solubility of some of the input compounds, ISART production of soda ash was found to proceed at a slow rate. For example, using the presently used raw materials used in the Solvay Process, namely limestone (calcium carbonate), salt brine (sodium chloride) and ammonia, it was believed that ISART could be used to easily and efficiently form sodium carbonate by replacing the calcium ions in calcium carbonate with sodium ions from sodium chloride; and the process would also be useful to combine the remaining oppositely charged ions, namely chlorine and calcium ions, to from calcium chloride. While in theory all looked good, it was found that the low solubility of limestone/calcium carbonate slows down the ISART process to a point of impracticality. Although the solubility of calcium carbonate in water can be increased by pressurizing the solvent (i.e. water) with carbon dioxide and dissolving it in the water, the improved solubility was determined to be insufficient for large industrial applications. The low solubility of calcium carbonate thus places a limitation on the capability of ISART for the industrial production of sodium carbonate using the raw materials of the Solvay Process.

To overcome such limitations, the present inventor has improved the ISART process so that it is practical to produce industrial amounts of soda ash. Thus it is possible to change the Solvay process to one similar to Hou's process, by using carbon dioxide ($CO_2$) as an input while at the same time producing hydrochloric acid and recovering ammonia for reuse, without any need for lime. Here, referring to FIGS. 4, 5, 6 and 7 and the process described earlier for production of caustic soda and hydrochloric acid, it could be appreciated that if simultaneous with production of caustic soda in Ion Sink 141 carbon dioxide is injected into this Ion Sink, the resulting product will be caustic soda according to the following equation:

$$2\ NaOH + CO_2 \rightarrow Na_2CO_3 + H_2O \quad \text{(Equation 7)}$$

Therefore, the ISART process can produce Soda Ash more easily if $CO_2$ gas is introduced as one of the input materials eliminating the need for ammonia. Yet another variation would be to use carbon dioxide in a similar column as in Solvay process where instead of producing carbon dioxide by calcining lime stone, another source of carbon dioxide is used for injecting into the solution comprising a mixture of ammonia and sodium chloride as in Equation 3 and processing the remaining solution of ammonium chloride using ISART to recover the ammonia as described with respect to FIGS. 6 and 7. Here in place of practically useless calcium chloride, hydrochloric acid will be produced. This eliminates the need for continuous supply of ammonia as well.

While the present invention has been illustrated by the description of embodiments and examples thereof, it is not intended to restrict or in any way limit the scope of the appended claims to such detail. Additional advantages and modifications will be readily apparent to those skilled in the art. Accordingly, departures may be made from such details without departing from the scope of the invention.

What is claimed is:

1. A process for separation and selective recomposition of ions, the process comprising:
a) providing a first cell comprising a first insulated container, a first ion selective membrane, and a second ion selective membrane, wherein the first and second ion selective membranes divide the volume of the first insulated container into a first hydraulically isolated section, a second hydraulically isolated section and a third hydraulically isolated section, wherein the third hydraulically isolated section is located between the first and the second ion selective membranes;
b) providing a second cell comprising a second insulated container, a third ion selective membrane, and a fourth ion selective membrane, wherein the third and fourth ion selective membranes divide the volume of the second insulated container into a fourth hydraulically isolated section, a fifth hydraulically isolated section and a sixth hydraulically isolated section, wherein the sixth hydraulically isolated section is located between the third and the fourth ion selective membranes;
c) providing a first electrolyte solution in the first hydraulically isolated section, a second electrolyte solution in the second hydraulically isolated section, a third electrolyte solution in the fourth hydraulically isolated section, and a fourth electrolyte solution in the fifth hydraulically isolated section, wherein each electrolyte solution comprises positive ions and negative ions;
d) separating the positive ions from the negative ions in each of the first, second, third, and fourth electrolyte solutions, wherein separating comprises the steps of:
i) placing a first EDLC electrode inside the first electrolyte solution;
ii) placing a second EDLC electrode inside the second electrolyte solution;
iii) placing a third EDLC electrode inside the third electrolyte solution;
iv) placing a fourth EDLC electrode inside the fourth electrolyte solution; and
v) applying an electric potential difference between the first EDLC electrode and the second EDLC electrode and between the third EDLC electrode and the fourth EDLC electrode, such that two capacitors in series are formed in each of the first, second, third and fourth electrolyte solutions, wherein each of the two capacitors in series comprises:

1) An inner internal capacitor formed between the EDLC electrode and the ions collected on and in close proximity to the EDLC electrode; and
2) an outer internal capacitor formed at the outer perimeter of the electrolyte solution, wherein the formation of the outer internal capacitor in each of the first, second, third and fourth electrolyte solutions leads to capacitive collection, concentration and voltage buildup of excess charges on the outer perimeters of the first, second, third and fourth electrolyte solutions;

e) electrically drawing the positive and negative ions out of each of the first, second, third and fourth electrolyte solutions as oppositely charged positive and negative ion streams, wherein each of the positive and negative ion streams is selectively drawn through the ion selective membrane selective to the ion stream, and wherein the polarity of charges applied to the first EDLC electrode and the fourth EDLC electrode are the same and the polarity of the charges applied to the second EDLC electrode and the third EDLC electrode are the same;

f) pooling the positive or negative ion stream from the first electrolyte solution and the oppositely charged ion stream from the second electrolyte solution into the third hydraulically isolated section, wherein the third hydraulically isolated section serves as a first ion sink allowing for the formation of new chemical compounds;

g) pooling the positive or negative ion stream from the third electrolyte solution and the oppositely charged ion stream from the fourth electrolyte solution into the sixth hydraulically isolated section, wherein the sixth hydraulically isolated section serves as a second ion sink allowing for the formation of new chemical compounds;

h) thereafter switching the location of the EDLC electrodes from the first cell and the second cell before occurrence of reactions at the EDLC electrodes, the step of switching the EDLC electrodes from the first cell to the second cell comprising:
  i) removing the first, second, third and fourth EDLC electrodes from their respective first, second, third and fourth electrolyte solutions;
  ii) placing the first EDLC electrode in the third electrolyte solution;
  iii) placing the second EDLC electrode in the fourth electrolyte solution;
  iv) placing the third EDLC electrode in the first electrolyte solution;
  v) placing the fourth EDLC electrode in the second electrolyte solution; and
  vi) repeating steps (d)(v) through (h)(v).

2. The process of claim 1, wherein each of the ion selective membranes allows the passage of ions of the same polarity as the charge applied to the electrode in its related hydraulically isolated section.

3. The process of claim 1, wherein the first ion selective membrane is an anion selective membrane, the second ion selective membrane is a cation selective membrane, the third ion selective membrane is a cation selective membrane, and the fourth ion selective membrane is an anion selective membrane.

4. A process for separation and selective recomposition of ions, the process comprising:

a) providing a first cell comprising a first insulated container, a first ion selective membrane, and a second ion selective membrane, wherein the first and second ion selective membranes divide the volume of the first insulated container into a first hydraulically isolated section, a second hydraulically isolated section and a third hydraulically isolated section, wherein the third hydraulically isolated section is located between the first and the second ion selective membranes;

b) providing a second cell comprising a second insulated container, a third ion selective membrane, and a fourth ion selective membrane, wherein the third and fourth ion selective membranes divide the volume of the second insulated container into a fourth hydraulically isolated section, a fifth hydraulically isolated section and a sixth hydraulically isolated section, wherein the sixth hydraulically isolated section is located between the third and the fourth ion selective membranes;

c) providing a first electrolyte solution in the first hydraulically isolated section, a second electrolyte solution in the second hydraulically isolated section, a third electrolyte solution in the fourth hydraulically isolated section, and a fourth electrolyte solution in the fifth hydraulically isolated section, wherein each electrolyte solution comprises positive ions and negative ions;

d) separating the positive ions from the negative ions in each of the first, second, third, and fourth electrolyte solutions, wherein separating comprises the steps of:
  i) placing a first low capacitance electrode inside the first electrolyte solution;
  ii) placing a first EDLC electrode inside the second electrolyte solution;
  iii) placing a second low capacitance electrode inside the third electrolyte solution;
  iv) placing a second EDLC electrode inside the fourth electrolyte solution; and
  v) applying an electric potential difference via a first current supply source between the first low capacitance electrode inside the first electrolyte solution and the first EDLC electrode inside the second electrolyte solution, wherein the first electrolyte solution is a basic solution and the second electrolyte solution is a salt solution, such that a stream of negative ions flows through the first ion selective membrane and a stream of positive ions flows through the second ion selective membrane;
  vi) applying an electric potential difference via a second current supply source between the second low capacitance electrode inside the third electrolyte solution and the second EDLC electrode inside the fourth electrolyte solution, wherein the third electrolyte solution is an acidic solution and the fourth electrolyte solution is a salt solution which is the same as the second electrolyte solution, such that a stream of positively charged ions flows through the third ion selective membrane and a stream of negatively charged ions flows through the fourth ion selective membrane;

e) pooling the stream of negative ions flowing through the first ion selective membrane and the stream of positive ions flowing through the second ion selective membrane into the third hydraulically isolated section, wherein the third hydraulically isolated section serves as a first ion sink allowing for the formation of new chemical compounds;

f) pooling the stream of positively charged ions flowing through the third ion selective membrane and the stream of negatively charged ions flowing through the fourth ion selective membrane into the sixth hydraulically isolated section, wherein the sixth hydraulically isolated section serves as a second ion sink allowing for the formation of new chemical compounds;

g) thereafter switching the location of the first and second EDLC electrodes from the second hydraulically isolated section and the fifth hydraulically isolated section before occurrence of redox reactions at the EDLC electrodes, the step of switching the first and second EDLC electrodes from the second hydraulically isolated section and the fifth hydraulically isolated section comprising:

i) removing the first and second EDLC electrodes from their respective second and fifth hydraulically isolated sections;

ii) placing the first EDLC electrode from the second hydraulically isolated section into the fifth hydraulically isolated section;

iii) placing the second EDLC electrode from the fifth hydraulically isolated section into the second hydraulically isolated section; and iv) repeating steps (d)(v) through (g)(iii).

\* \* \* \* \*